(12) United States Patent
Song

(10) Patent No.: US 8,256,315 B2
(45) Date of Patent: Sep. 4, 2012

(54) APPARATUS FOR AUTOMATICALLY ADJUSTING CLEARANCE OF SUPPORT YOKE

(75) Inventor: Joon-kyu Song, Seongnam (KR)

(73) Assignee: Mando Corporation, Gyeonggi-do (KR)

( * ) Notice: Subject to any disclaimer, the term of this patent is extended or adjusted under 35 U.S.C. 154(b) by 1063 days.

(21) Appl. No.: 12/151,845

(22) Filed: May 9, 2008

(65) Prior Publication Data
US 2008/0295629 A1 Dec. 4, 2008

(30) Foreign Application Priority Data
May 31, 2007 (KR) .................. 10-2007-0053280

(51) Int. Cl.
*F16H 1/04* (2006.01)
*F16H 35/00* (2006.01)
*B62D 7/16* (2006.01)
*B62D 3/12* (2006.01)

(52) U.S. Cl. .................. 74/422; 74/388 PS; 280/93.51; 280/93.514

(58) Field of Classification Search .............. 74/388 PS, 74/406, 409, 411, 422, 497; 280/93.51, 93.512, 280/93.514, 93.515; 180/427; 248/183.4, 248/224.51, 292.12, 292.13, 408, 412
See application file for complete search history.

(56) References Cited

U.S. PATENT DOCUMENTS

| | | | | |
|---|---|---|---|---|
| 3,777,589 A | * | 12/1973 | Adams | 74/498 |
| 4,691,583 A | * | 9/1987 | Taig | 74/422 |
| 4,709,593 A | * | 12/1987 | Takeuchi | 74/498 |
| 4,788,878 A | * | 12/1988 | Morita et al. | 74/422 |
| 5,265,691 A | | 11/1993 | Konishi et al. | |

(Continued)

FOREIGN PATENT DOCUMENTS
JP 5-50925 3/1993
(Continued)

OTHER PUBLICATIONS

Chinese Office Action, w/ English translation thereof, issued in Chinese Patent Application No. CN 2008101103067 dated Nov. 13, 2010.
Japanese Notification of Reason for Refusal, w/ English translation thereof, issued in Japanese Patent Application No. JP 2008-126315 dated Dec. 7, 2010.

*Primary Examiner* — Justin Krause
*Assistant Examiner* — Adam D Rogers
(74) *Attorney, Agent, or Firm* — McDermott Will & Emery LLP

(57) ABSTRACT

Disclosed is an apparatus for automatically adjusting clearance of a support yoke of a rack and pinion type steering apparatus, the apparatus including: a support yoke making contact with one side of a rack bar so as to support the rack bar; at least one cam assembled with one side of the support yoke so as to support the support yoke; a yoke plug which is positioned at one side of the cam so as to support the cam and is assembled with a rack housing; and a yoke spring included at one side of the support yoke so as to apply elastic force to the support yoke in a direction of the rack bar. In a case where the support yoke is worn away due to friction, etc. against the rack bar, while the cam performs relative rotation movement respective to the support yoke by means of an elastic force of the elastic member disposed between the support yoke and the cam, the spacing member pushes the support yoke in a direction of the rack bar so as to maintain a predetermined interval between the spacing member and the support yoke, thereby maintaining clearance of the support yoke in a predetermined degree.

6 Claims, 10 Drawing Sheets

U.S. PATENT DOCUMENTS

| | | | |
|---|---|---|---|
| 2003/0074996 A1* | 4/2003 | Camp | 74/422 |
| 2007/0209463 A1* | 9/2007 | Song et al. | 74/388 PS |
| 2008/0006111 A1* | 1/2008 | Douma et al. | 74/422 |
| 2010/0018337 A1* | 1/2010 | Kawakubo et al. | 74/422 |
| 2011/0193331 A1* | 8/2011 | Heo | 280/779 |

FOREIGN PATENT DOCUMENTS

JP    2001-152819    6/2001

* cited by examiner

APPARATUS FOR AUTOMATICALLY ADJUSTING CLEARANCE OF SUPPORT YOKE

CROSS-REFERENCE TO RELATED APPLICATION

This non-provisional application claims priority under 35 U.S.C §119(a) on Patent Application No. 10-2007-0053280 filed in Korea on MAY 31, 2007, the entire contents of which are hereby incorporated by reference.

BACKGROUND OF THE INVENTION

1. Field of the Invention

The present invention relates to an apparatus for automatically adjusting the clearance of a support yoke, and more particularly to an apparatus for automatically adjusting clearance of a support yoke, in which a cam, a spacing member, and an elastic member are included, and in a case where a support yoke is worn away due to friction, etc. against a rack bar, while the cam performs relative rotation movement respective to the support yoke by means of an elastic force of the elastic member disposed between the support yoke and the cam, the spacing member pushes the support yoke in a direction of the rack bar so as to maintain a predetermined interval between the spacing member and the support yoke, thereby maintaining clearance of the support yoke in a predetermined degree.

2. Description of the Prior Art

A steering apparatus is an apparatus allowing a driver to change a progressing direction of a vehicle according to the driver's desire, i.e. an auxiliary apparatus which can change a rotation center, about which a front wheel of the vehicle is rotated, so as to allow a vehicle to move in a desired direction.

FIG. 1 is a schematic sectional view of a typical steering apparatus for a vehicle.

As shown in FIG. 1, a conventional steering apparatus includes a steering wheel 100 equipped with a seat, a steering shaft 105 connected with the steering wheel, a steering column 103 allowing the steering shaft to be fixed to a chassis, a gear box 130 including a rack gear 110 and a pinion gear 120 which convert rotational force inputted from the steering shaft 105 to linear movement, a rack bar 140 having an inner ball joint 135 included in both ends thereof, a tie rod 150 formed integrally with a ball of the inner ball joint 135, and an outer ball joint 155 included in an end of the tie rod 150. Also, the tie rod 150 is connected with the knuckle 159 of a tire 158 in such a manner that the tie rod 150 is connected with the outer ball joint 155.

FIG. 2 is a side sectional view of a conventional rack and pinion type gear box. The gear box 130 includes a pinion shaft 276, a rack bar 140, a support yoke 260, a yoke spring 263, a yoke plug 265, and a rack housing 270. The rack and pinion type gear box 130 converts rotational force inputted from the steering shaft 105 to linear movement as described above.

The pinion shaft 276 receives rotational force from an input shaft connected with the steering shaft 105 so as to transfer the rotational force to the rack bar 140. The pinion shaft 276 is connected with the input shaft through a torsion bar, and a pinion gear 120, which is engaged with the rack gear 110, is formed at an end of the pinion shaft 276.

The rack bar 140 is assembled with the pinion shaft 276 so as to convert rotational movement to linear movement. The rack bar 140 has a bar-shape extending between front wheels and has inner ball joints 135 formed at both ends thereof. A rack gear 110, which is engaged with the pinion gear of the pinion shaft 276, is formed between the inner ball joints 135.

The support yoke 260 properly maintains clearance between the rack bar 140 and the pinion shaft 276 so as to allow power to be smoothly transferred. The support yoke 260 is positioned at a side opposite to a surface where the rack gear 110 is formed, which is a rear surface of the rack bar 140, and has a structure which can move in front and rear directions in such a manner that it is inserted into the rack housing 270 having a cylinder.

The support yoke 260 has a cylindrical shape so as to slide in front and rear directions within the cylinder of the rack housing 270, and a front part of the support yoke 260 making contact with the rack bar 140 has a semi-circular shaped groove so as to make close contact with a rear surface of the rack bar 140.

Also, in order to effectively transfer power in such a manner that the rack bar 140 and the pinion shaft 276 make close contact with each other, the yoke spring 263 is disposed at a rear side of the support yoke 260 so as to push the support yoke 260 under a predetermined amount of pressure, thereby compensating clearance generating between the rack bar 140 and the pinion shaft 276.

Such a support yoke 260 has sliding friction against the rear surface of the rack bar 140. Therefore, in order to prevent the rack bar 140 from being worn away or prevent generation of noise due to the friction, a support yoke 260 made from plastic material, which is ductile material in comparison with the rack bar 140, is used.

The yoke spring 263 performs a function for applying pressure so as to allow the support yoke 260 to make close contact with the rack bar 140, and a coil spring is typically used as the yoke spring. The yoke plug 265 is positioned at a rear surface of the yoke spring 263 so as to support the yoke spring 263.

The yoke plug 265 applies pressure to the support yoke 260 in such a manner that the yoke plug 265 supports the yoke spring 263. It is typical that the yoke plug 265 has a male screw-thread so as to be assembled with the rack housing 270 having a female screw-thread. The yoke plug 265 has a groove, into which a wrench can be inserted, formed at a rear surface thereof. Therefore, when the yoke plug 265 is assembled, or clearance is generated between the rack bar 140 and the pinion shaft 276, tension of the yoke spring 263 can be adjusted by tightening the yoke plug 265 by the wrench.

As such, in the structure where clearance between the rack bar 140 and the pinion shaft 276 is compensated in such a simple manner that the conventional support yoke 260 is pressured by the yoke spring 263, there is a gap of about 0.05 mm formed between the yoke plug 265 and the support yoke 260.

However, over long term use, the support yoke 260 moves in a direction of the rack bar 140 so that the gap between the yoke plug 265 and the support yoke 260 increases. As a result, the yoke plug and the support yoke collide with each other, thereby generating noise due to vibration. In order to prevent noise generated due to vibration, the yoke plug 265 has to be again adjusted. Also, replacement of the entire of the steering apparatus is often necessary in a process for maintaining. Therefore, an apparatus, which can automatically compensate clearance without separate adjusting operation, has been required.

SUMMARY OF THE INVENTION

Accordingly, the present invention has been made to solve the above-mentioned problems occurring in the prior art, and an object of the present invention is to provide an apparatus for automatically adjusting clearance of a support yoke, the apparatus including: a support yoke, which includes at least one first guide part formed along a circumference thereof while extending from a first large width part to a first small width part and at least one first fixing groove formed at the first large width part; a cam, which includes at least one second guide part formed along a circumference of the cam while extending from a second large width part to a second small width part and at least one second fixing groove formed at the second large width part; at least one spacing member, which is disposed along the second guide part and has a portion protruding from the second guide part; and at least one elastic member disposed between the first fixing groove and the second fixing groove, so that in a case where the support yoke is worn away due to friction, etc. against a rack bar, when the cam performs relative rotation movement respective to the support yoke by means of an elastic force of the elastic member disposed between the first fixing groove of the support yoke and the second fixing groove of the cam, the spacing member pushes the support yoke in a direction of the rack bar while moving along the first guide part of the support yoke so as to maintain a predetermined interval between the spacing member and the support yoke, thereby maintaining clearance of the support yoke at a predetermined degree.

In accordance with the present invention, there is provided an apparatus for automatically adjusting clearance of a support yoke of a rack and pinion type steering apparatus, the apparatus including: a support yoke making contact with one side of a rack bar so as to support the rack bar; at least one cam assembled with one side of the support yoke so as to support the support yoke; a yoke plug which is positioned at one side of the cam so as to support the cam and is assembled with a rack housing; and a yoke spring included at one side of the support yoke so as to apply elastic force to the support yoke in a direction of the rack bar.

BRIEF DESCRIPTION OF THE DRAWINGS

The above and other objects, features and advantages of the present invention will be more apparent from the following detailed description taken in conjunction with the accompanying drawings, in which:

FIG. 4e is a sectional view taken along the line C-C of FIG. 4a;

FIG. 6b is view illustrating an enlarged part A of FIG. 6a.

DETAILED DESCRIPTION OF THE PREFERRED EMBODIMENTS

Figure 1:
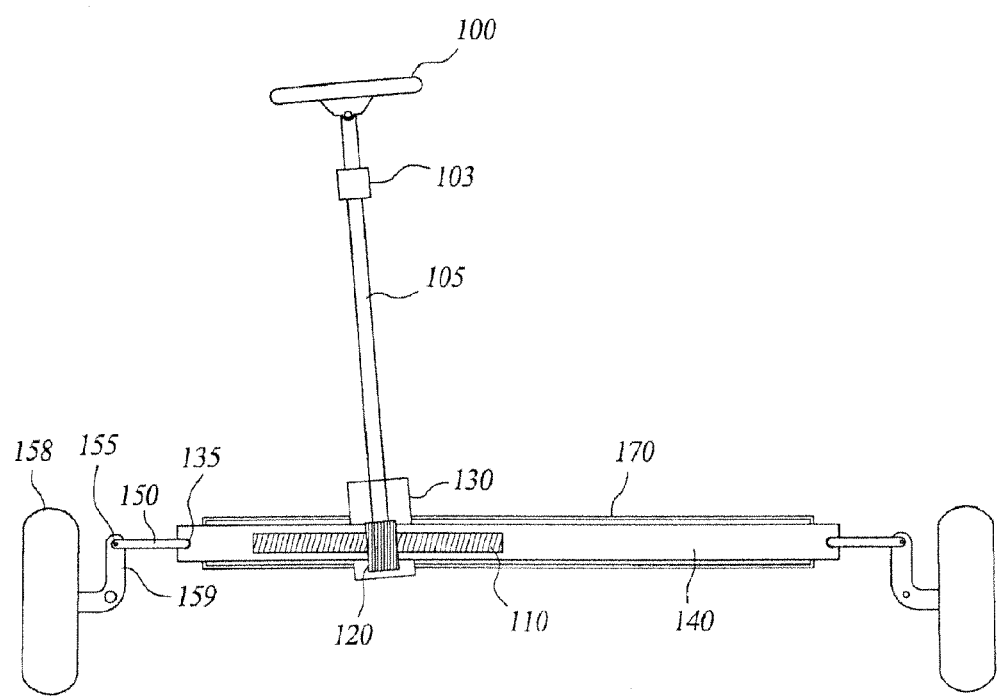
FIG. 1 is a schematic view of the structure of a typical steering apparatus for a vehicle.

Hereinafter, a preferred embodiment of the present invention will be described with reference to the accompanying drawings. In the following description and drawings, the same reference numerals are used to designate the same or similar components, and so repetition of the description on the same or similar components will be omitted.

A spacing member can be included between a support yoke and a cam, which make contact with each other, and an elastic member can be included in the cam. The description of each embodiment of the spacing member and the elastic member will be mentioned in descriptions about an apparatus for automatically adjusting the clearance of a support yoke according to a first embodiment of the present invention and an apparatus for automatically adjusting the clearance of a support yoke according to a second embodiment of the present invention.

Figure 3A:
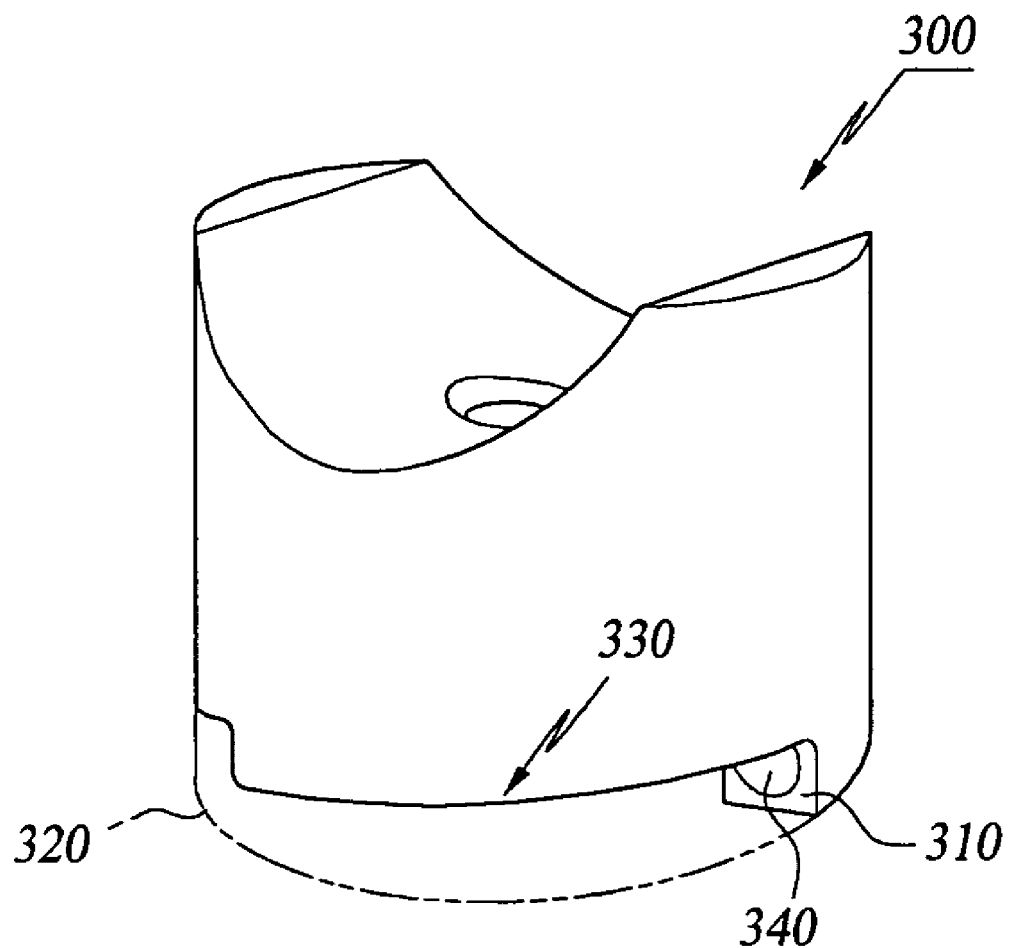
FIG. 3a is a perspective view of a support yoke of an apparatus for automatically adjusting clearance of a support yoke according to a first embodiment of the present invention.
Figure 3B:
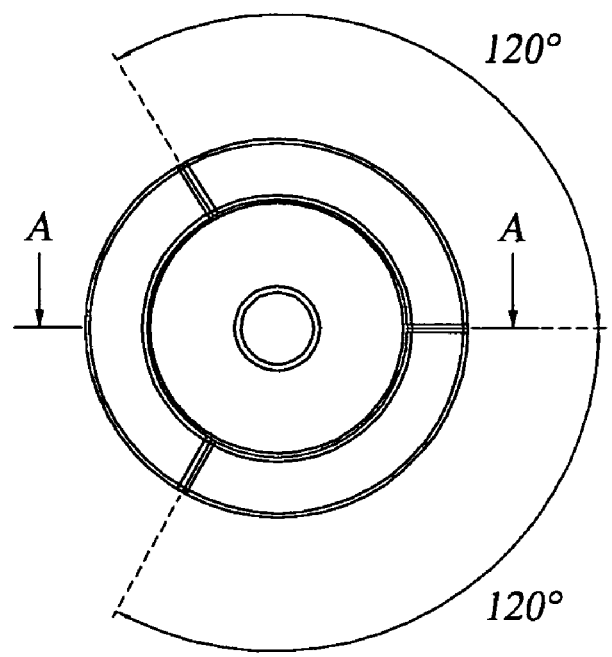
FIG. 3b is a bottom view illustrating a support yoke of an apparatus for automatically adjusting clearance of a support yoke according to the first embodiment of the present invention.
Figure 3C:
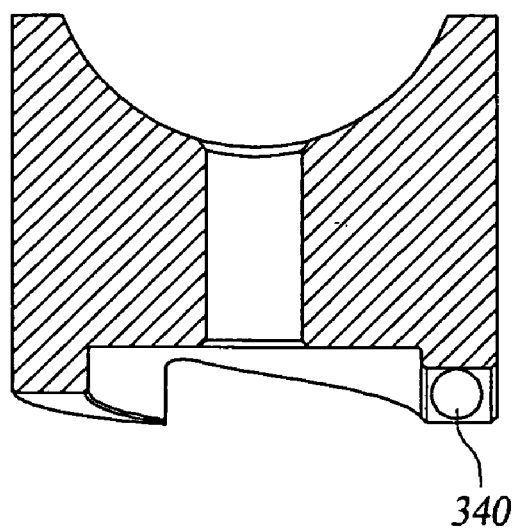
FIG. 3c is a sectional view taken along the line A-A of FIG. 3b.

FIG. 3a is a perspective view of a support yoke of the apparatus for automatically adjusting clearance of a support yoke according to the first embodiment of the present invention, FIG. 3b is a bottom view illustrating a support yoke of the apparatus for automatically adjusting clearance of a support yoke according to the first embodiment of the present invention, and FIG. 3c is a sectional view taken along the line A-A of FIG. 3b.

As shown in FIGS. 3a, 3b, and 3c, a support yoke 300 according to the first embodiment of the present invention includes at least one first guide part 330 formed along a circumference thereof while extending from a first large width part 310 to a first small width part 320 and at least one first fixing groove 340 formed at the first large width part 310.

Herein, the first large width part 310 is a part where the first fixing groove 340 is formed. Also, if an imaginary line extends from the first large width part 310 shown in FIG. 3a, the first small width part 320 is a part formed between the imaginary line positioned just before a point, at which another large width part begins, and the first guide part 330.

At least one first guide part 330 is formed at one end of the support yoke 300 along a circumference thereof, and extends from the first large width part 310 to the first small width part 320, while having an elongated shape.

In the first embodiment of the present invention, it is illustrated that three first guide parts 330 are formed along a circumference of the support yoke 300. However, the number of the first guide part 330 is not limited in the first embodiment so that it is also possible that the number thereof can be less than two or more than four.

In a case where three first guide parts 330 are formed according to the first embodiment of the present invention, it is preferable that each angle formed between extending lines of first large width parts 310 formed at the first guide parts 330 is 120° (see FIG. 3b).

The first guide part 330 performs a guide function so as to allow a spacing member 460 (see FIG. 4d) inserted into an inserting groove 450 (see FIG. 4a) of a cam 400 (see FIG. 4a) to move while making contact according to rotation of the cam 400, and extends from the first large width part 310 to the first small width part 320 while corresponding to a second guide part 430 (see FIG. 4a) of the cam 400.

That is, the first large width part 310 meets a second large width part 410 (see FIG. 4a) of the cam 400, and the first small width part 320 meets a second small width part 410 (see FIG. 4a) of the cam 400. As such, when the support yoke 300 and the cam 400 are assembled with each other, the support yoke 300 assembled with the cam 400 has a shape similar to the shape of a conventional support yoke 260 (see FIG. 2).

The first large width part 310 has a first fixing groove 340 formed by recessing the first large width part 310.

The first large width part 310 has the first fixing groove 340 formed by recessing the first large width part 310 in a direction opposite to the first small width part 320. When the second large width part 410 of the cam 400 is assembled with the first large width part 310, the first fixing groove 340 corresponds to the second fixing groove 440 formed at the second large width part 410 so that the first fixing groove 340 provides a space, which allows an elastic member 470 (see FIG. 4a) to be disposed therein, between the first fixing groove 340 and the second fixing groove 440.

It is preferable that the diameter of the first fixing groove 340 is properly formed according to the diameter of the elastic member 470, and the depth of the first fixing groove 340 is determined according to elastic force of the elastic member 470 which is required.

In the first embodiment of the present invention, although it is illustrated that each first fixing groove 340 is formed at the three first large width part 310, the number of the first large width part 310 can be less than two or more than four so that the number of the first fixing groove 340 is preferably determined according to the number of the first large width part 310. Also, there is no limitation in that the number of the first fixing groove 340 is equal to the number of the first large width part 310. Therefore, first fixing grooves 340, the number of which is less than the number of the first large width part 310, can be distributed at several first large width parts 310.

It is preferable that the slant of the first guide part 330 extending from the first large width part 310 to the first small width part 320 (the slant is equal to the slant of the second guide part 430 of the cam 400) is properly formed in such a manner that a predetermined interval between the first guide part 330 of the support yoke 300 and the second guide part 430 of the cam 400 is maintained according to rotation of the cam 400.

That is, if the slant is steep, it is possible to compensate an interval between the first guide part 330 and the spacing member 460 even if the cam 400 rotates at a less degree. Meanwhile, if the slant is gentle, the cam 400 has to rotate at a much higher degree in comparison with the case where the slant is steep so as to compensate the interval between the first guide part 330 and the spacing member 460. Therefore, the slant of the first guide part 330 can be determined while considering elastic force of the elastic member 470 and the amount of rotation of the cam 400 according to the elastic force.

Figure 4A:
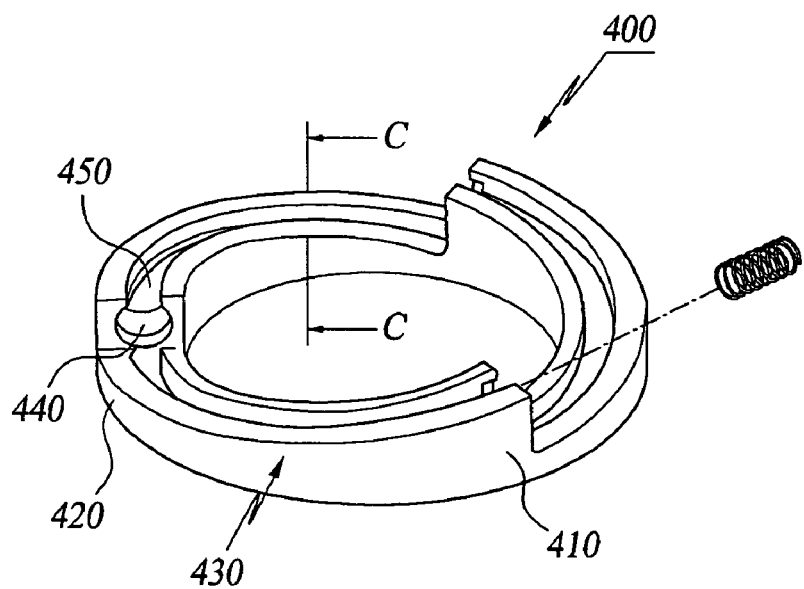
FIG. 4a is a perspective view of a cam of an apparatus for automatically adjusting clearance of a support yoke according to the first embodiment of the present invention.
Figure 4B:
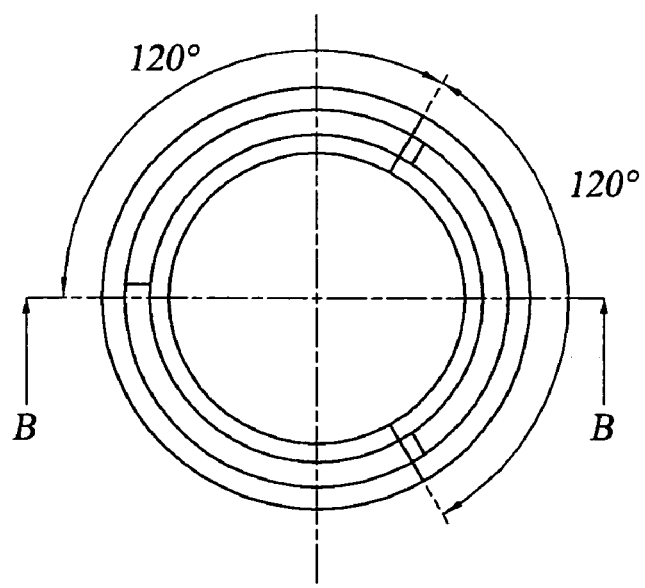
FIG. 4b is a bottom view of a cam of automatically adjusting clearance of a support yoke according to the first embodiment of the present invention.
Figure 4C:
FIG. 4c is a sectional view taken along the line B-B of FIG. 4b.
Figure 4D:
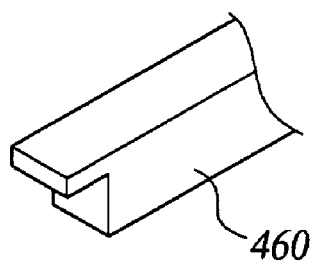
FIG. 4d is a perspective view of a part of a spacing member of an apparatus for automatically adjusting clearance of a support yoke according to the first embodiment of the present invention.
Figure 4E:
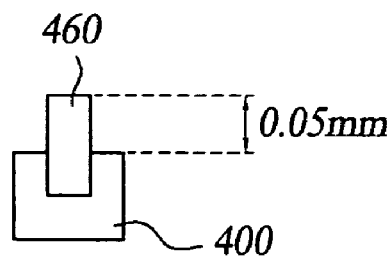

FIG. 4a is a perspective view of the cam of the apparatus for automatically adjusting clearance of a support yoke according to the first embodiment of the present invention, FIG. 4b is a bottom view of the cam of automatically adjusting clearance of a support yoke according to the first embodiment of the present invention, FIG. 4c is a sectional view taken along the line B-B of FIG. 4b, FIG. 4d is a perspective view of a part of the spacing member of the apparatus for automatically adjusting clearance of a support yoke according to the first embodiment of the present invention, and FIG. 4e is a sectional view taken along the line C-C of FIG. 4a.

As shown in FIGS. 4a, 4b, 4c, 4d, and 4e, the cam according to the first embodiment of the present invention includes at least one second guide part 430 formed along a circumference thereof while extending from the second large width part 410 to the second small width part 420 and at least one second fixing groove 440 formed at the second large width part 410. The cam also includes at least one elastic member 470 disposed between the second fixing groove 440 and the first fixing groove 340 (see FIG. 3a). Additionally, the cam may include at least one spacing member 460, which is disposed along the second guide part 430 and has a portion protruding from the second guide part 430. The spacing member 460 may be inserted into at least one inserting groove 450 formed at the second guide part 430 in a longitudinal direction.

The cam 400 includes the second guide part 430 and the second fixing groove 440, and is assembled with an end of the support yoke 300 (see FIG. 3a).

At least one second guide part 430 is formed along a circumference of the cam 400 and has a structure extending from the second large width part 410 to the second small width part 420 while having an elongated shape.

In the first embodiment of the present invention, it is illustrated that three second guide parts 430 are formed along the circumference of the cam 400. However, the number of second guide parts 430 isn't limited in the illustration, so that the number thereof can be less than two or more than four.

However, it is preferable that the number of the second guide part 430 is equal to the number of first guide parts 330 (see FIG. 3a) formed at the support yoke 300 (see FIG. 3a).

As shown in the first embodiment of the present invention, if three second guide parts 430 are formed, it is preferable that each angle between extending lines of second large width parts 410 formed at the second guide parts 430 is 120° (see FIG. 4b).

The second large width part 410 is inserted into the first large width part 310 of the support yoke 300, and the second small width part 420 is inserted into the first small width part 320 of the support yoke 300.

The second large width part 410 has the second fixing groove 440 formed by recessing second large width part 410.

That is, the second fixing groove 440 extends from a position, at which the second large width part 410 starts to be formed, in a direction of the second small width part 420 while having a deep recess-shape. The second fixing groove 440 makes contact with the first fixing groove 340 of the support yoke 300 so that the elastic member 470 is disposed within the second fixing groove, and the number of the second fixing groove 440 is preferably determined according to the number of the second large width part 410.

Also, the depth of the second fixing groove 440 is preferably determined according to the depth of the first fixing groove 340 of the support yoke 300 and elastic force of the disposed elastic member 470, etc. It is preferable that the second fixing groove 440 is positioned higher than the second small width part 420 so as not to be overlapped with the second small width part 420.

The elastic member 470 is disposed between the second fixing groove 440 and the first fixing groove 340 (see FIG. 3a). The elastic member 470 preferably is a coil spring, etc., but it isn't limited to that. If any member can provide rotational force so as to allow the cam 400 to perform rotation respective to the support yoke 300 when the support yoke 300 is worn away due to friction against a rack bar, etc. so that the support yoke 300 moves in a direction of the rack bar, there is no limitation on the member becoming the elastic member 470.

Also, it is preferable that each elastic member 470 is disposed between at least one first fixing groove 340 (FIG. 3a) and at least one second fixing groove 440 formed according to the number of the first fixing groove 340.

The spacing member 460 is disposed along the second guide part 430 in such a manner that the spacing member 460 has a portion protruding upward from the second guide part 430. The spacing member 460 is preferably made from an elastic material such as rubber, plastic, etc. so as to maintain a predetermined clearance in such a manner that the spacing member 460 applies suitable elastic force between the cam 400 and the support yoke 300.

The number of spacing members is preferably determined according to the number of second guide parts 430. The second fixing groove 440 is formed by recessing the second large width part 410. It is preferable that a portion of the spacing member 460, at which the spacing member 460 makes contact with the second fixing groove 440, has a stepped shape having a depth as deep as a depth of the second fixing groove 440 so as to allow the elastic member 470 included in the second fixing groove 440 to be disposed at the portion (see FIG. 4d).

Because the spacing member 460 has to be fixed on the second guide part 430, a method for fixing the spacing member 460 on the second guide part 430 is required.

As such, as a method for fixing the spacing member 460 on the second guide part 430, it is possible to suggest a method for fixing the spacing member 460 on the second guide part 430 by means of an adhesive, etc. However, it is preferable that an inserting groove 450 is formed at the second guide part 430 and then the spacing member 460 is inserted into the inserting groove.

That is, the spacing member 460 is inserted into and fixed in the inserting groove 450 formed by recessing the second guide part 430.

At this time, in order to prevent the spacing member 460 from being easily released from the inserting groove 450, it is preferably that the inserting groove 450 is formed while having a width narrower than the width of the spacing member 460 in a less degree, and then the spacing member 460 is inserted into and fixedly assembled with the inserting groove 450.

It is preferable that the inserting groove 450 has a depth shallower than the depth of the spacing member 460 so as to allow a predetermined portion of the spacing member 460 to protrude upward from the second guide part 430 in a state where the spacing member 460 is completely inserted into the inserting groove 450 (see FIG. 4e).

At this time, it is preferable that the height of the portion of the spacing member, which protrudes upward from the second guide part 430, is maintained at about 0.05 mm.

Also, it is preferable that each inserting groove 450 is formed on at least one second guide part 430 formed along a circumference of the cam 400.

Figure 5A:
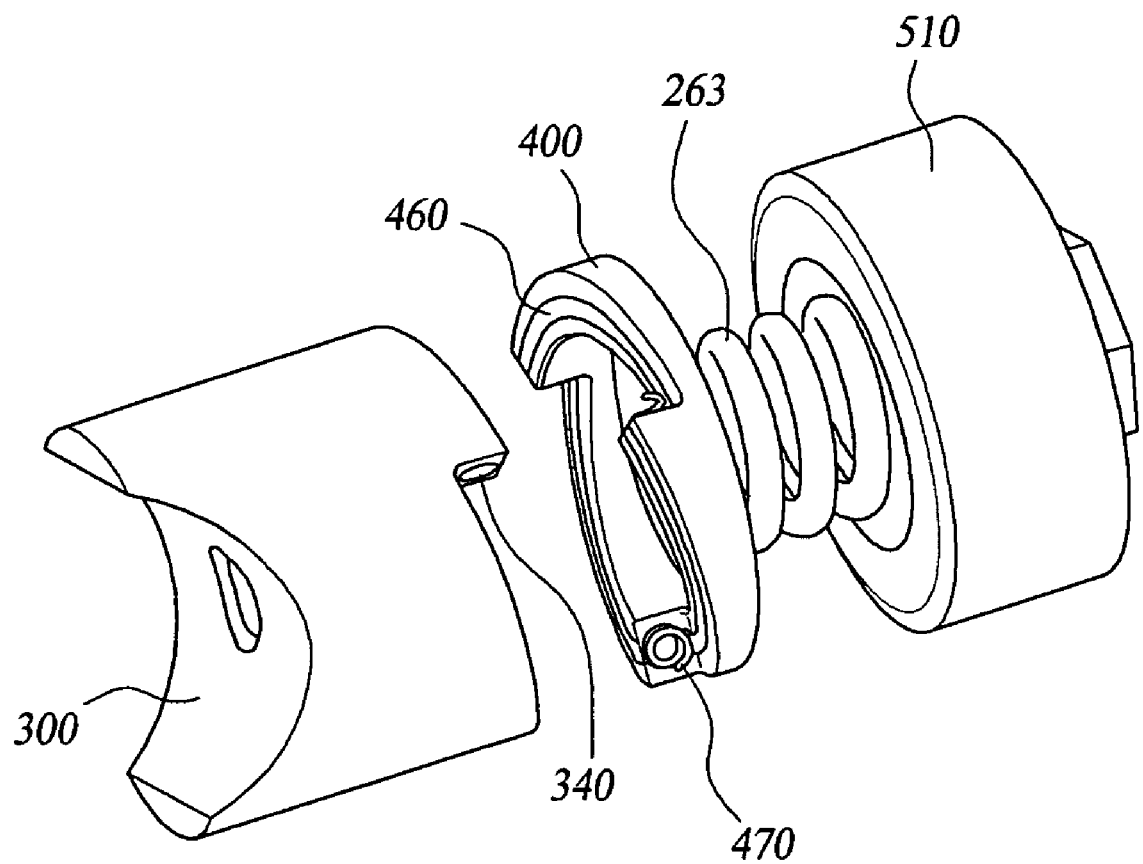
FIG. 5a is an exploded perspective view of an assembly of a support yoke, a cam, and a yoke plug of an apparatus for automatically adjusting clearance of a support yoke according to the first embodiment of the present invention.
Figure 5B:
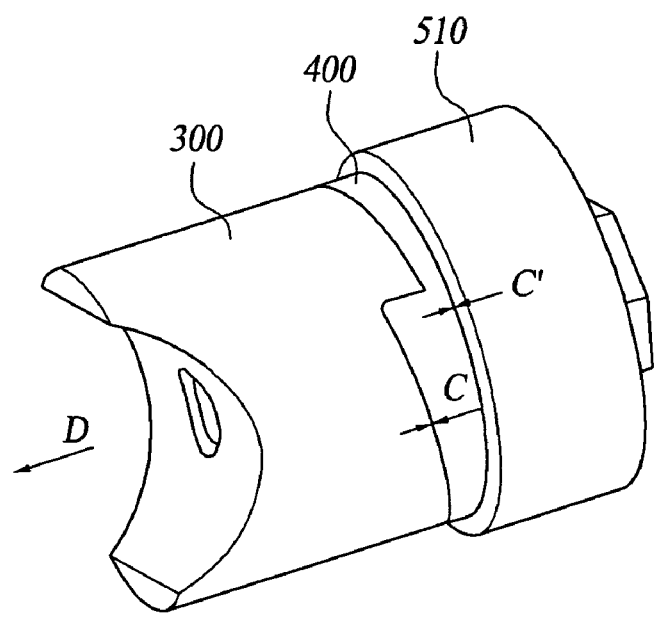
FIG. 5b is a perspective view of an assembly of a support yoke, a cam, and a yoke plug of an apparatus for automatically adjusting clearance of a support yoke according to the first embodiment of the present invention.
Figure 5C:
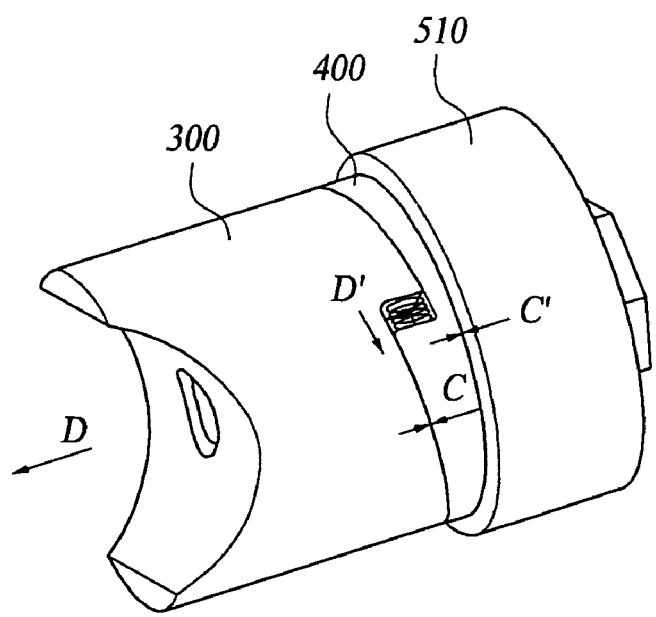
FIG. 5c is a perspective view of an apparatus for automatically adjusting clearance of a support yoke according to the first embodiment of the present invention, in which clearance has been adjusted.

FIG. 5a is an exploded perspective view of an assembly the support yoke, the cam, and the yoke plug of the apparatus for automatically adjusting clearance of a support yoke according to the first embodiment of the present invention, FIG. 5b is a perspective view of an assembly of the support yoke, the cam, and the yoke plug of the apparatus for automatically adjusting clearance of a support yoke according to the first embodiment of the present invention, and FIG. 5c is a perspective view of the apparatus for automatically adjusting clearance of a support yoke according to the first embodiment of the present invention, in which clearance has been adjusted.

With reference to FIGS. 5a, 5b, and 5c, each operational process of the support yoke 300 and the cam 400, etc. according to the first embodiment of the present invention will be described below.

Figure 2:
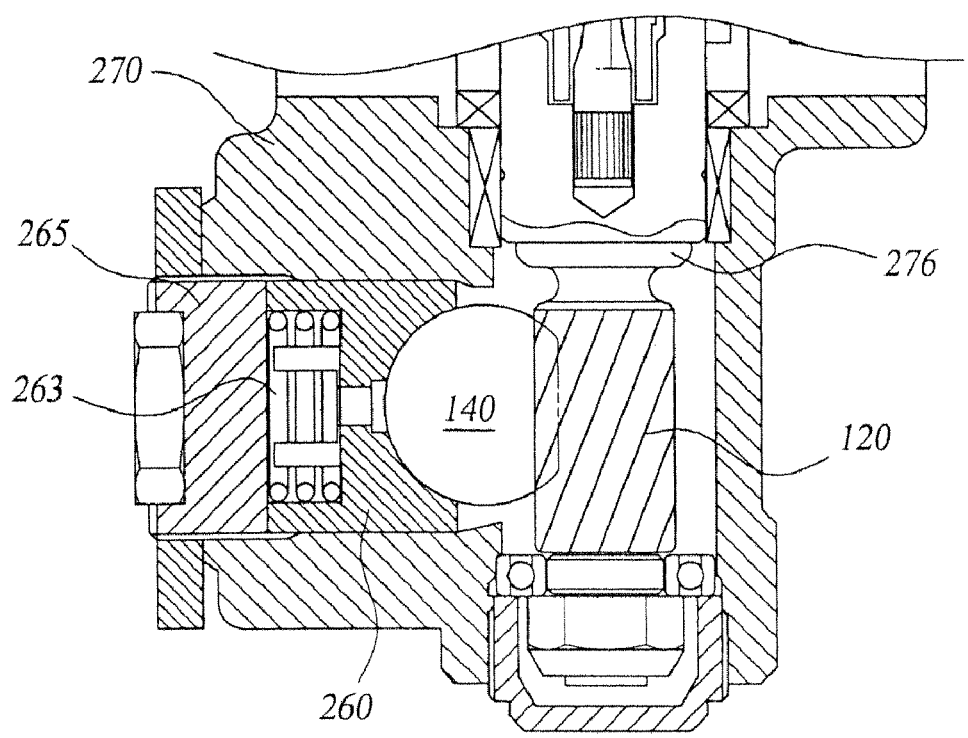
FIG. 2 is a side sectional view of a conventional rack and pinion type gear box.

Firstly, elastic force of the yoke spring 263 is adjusted so as to allow the support yoke 300 to properly support the rack bar, and the support yoke 300, the cam 400, and the yoke plug 510 are assembled with a rack housing 270 (see FIG. 2).

Herein, the yoke plug 510 has a shape equal to the shape of a conventional yoke plug 265 (see FIG. 2), and is made from a material equal to the material of the conventional yoke plug 265. The compressed elastic member 470 is disposed between the first fixing groove 340 of the support yoke 300 and the second fixing groove 440 of the cam 400.

That is, the second large width part 410 (see FIG. 4a) of the cam is inserted into the first large width part 310 (see FIG. 3a) of the support yoke 300, and clearance having a height as tall as the height of the portion of the spacing member 460, which protrudes upward from the inserting groove 450 (see FIG. 4a) of the cam 400, exists between the support yoke 300 and the cam 400.

Then, when the support yoke 300 is worn away due to friction, etc. against a rear surface of the rack bar, the support yoke 300 moves forward in a direction D of the rack bar due to elastic force of the yoke spring 263. When the support yoke 300 moves forward in the direction of the rack bar, the cam 400 performs rotational movement D' respective to the support yoke 300 due to restitution force of the elastic member 470 disposed between the first fixing groove 340 and the second fixing groove 440, thereby automatically maintaining clearance between the support yoke 300 and the cam 400 at a predetermined degree.

That is, due to restitution force of the elastic member 470, the cam 400 rotates along the first guide part 330 of the support yoke 300 as much as D' from the first large width part 310 toward a direction of the first small width part 320. Therefore, clearance C (see FIG. 5c) between the support yoke 300 and the cam 400 and clearance C' (see FIG. 5c) between the cam 400 and the yoke plug 510, are equal to clearance C (see FIG. 5b) between the support yoke 300 and the cam 400 and clearance C' (see FIG. 5b) between cam 400 and the yoke plug 510, which are formed after initial assembling, respectively. Each clearance between the support yoke 300 and the cam 400 and between the cam 400 and the yoke plug 510 is automatically adjusted at a predetermined degree. Accordingly, the generation of noise can be prevented.

Herein, it is preferable that clearance of about 0.05 mm is maintained.

Figure 6A:
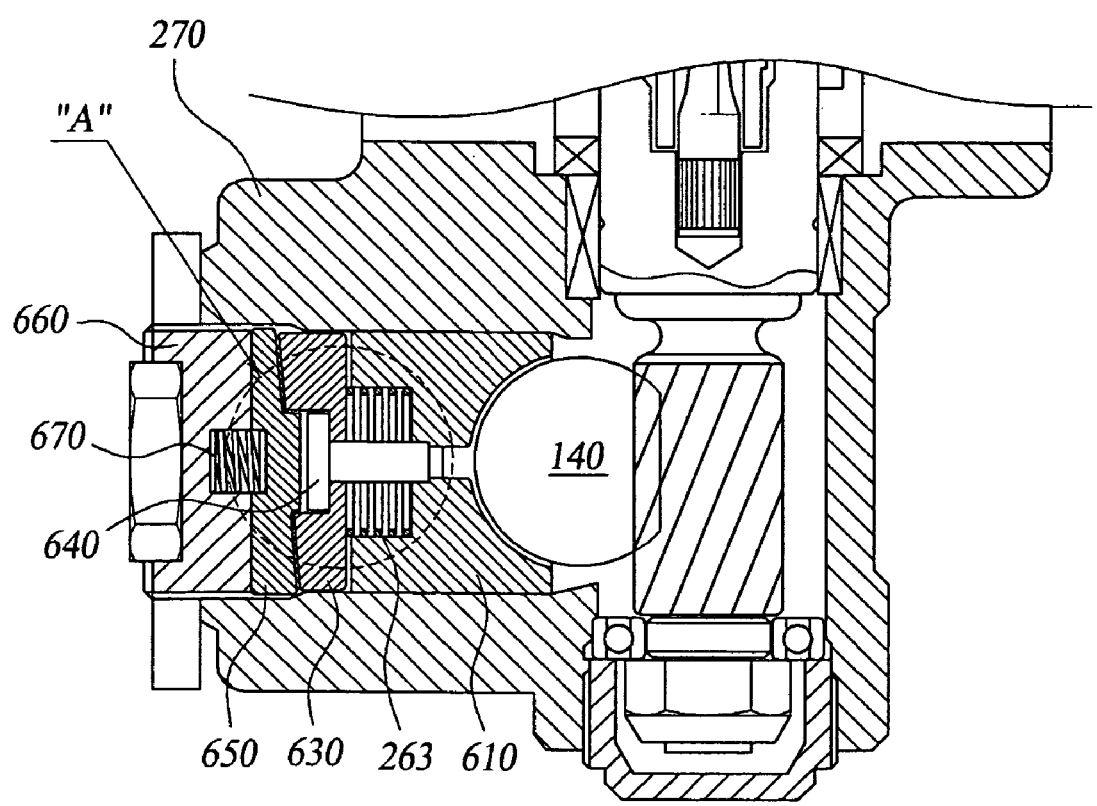
FIG. 6a is a sectional view of an apparatus for automatically adjusting clearance of a support yoke according to a second embodiment of the present invention.
Figure 6B:
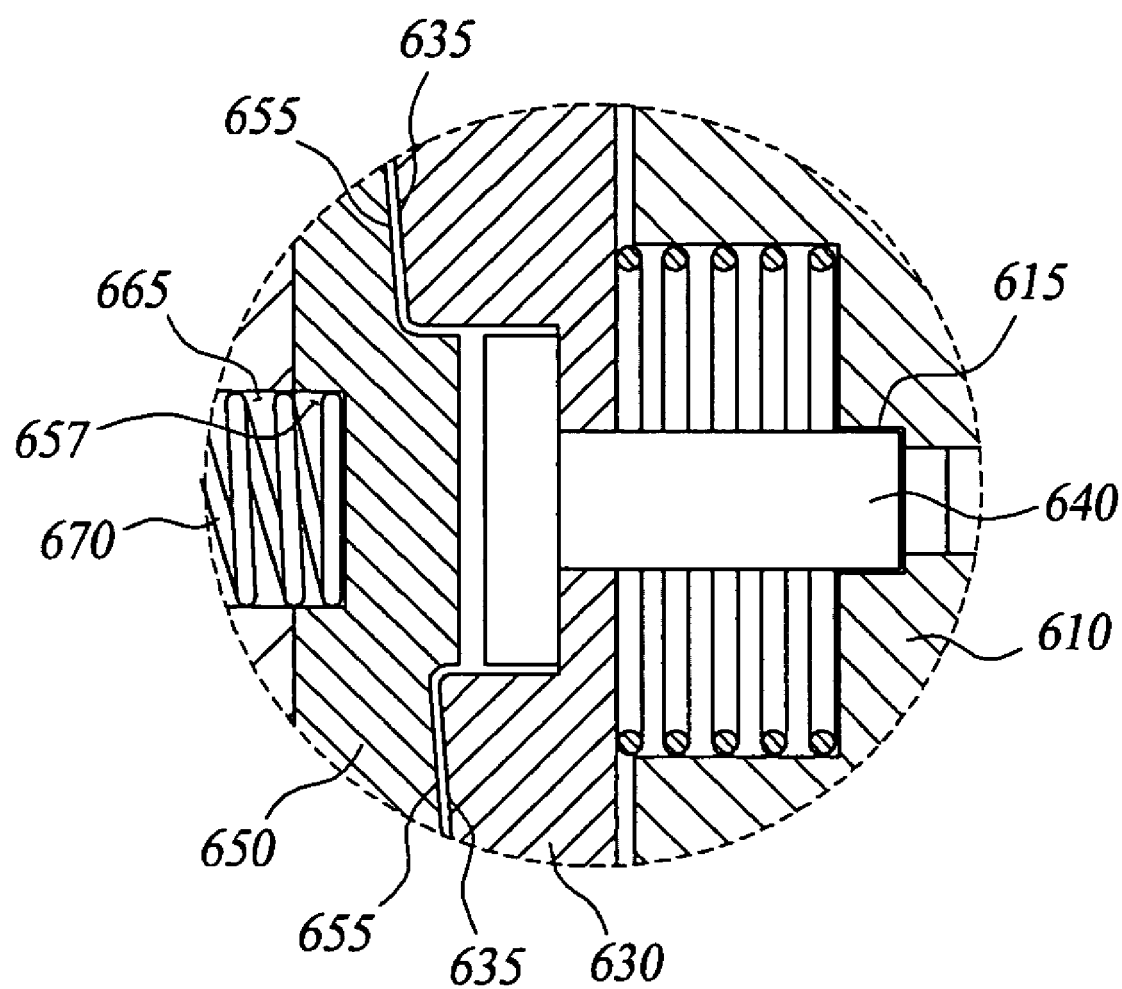

FIG. 6a is a sectional view of the apparatus for automatically adjusting the clearance of a support yoke according to a second embodiment of the present invention; and FIG. 6b is view illustrating an enlarged part A of FIG. 6a.

As shown in FIGS. 6a and 6b, an apparatus for automatically adjusting clearance of a support yoke according to a second embodiment of the present invention includes a support yoke 610, a yoke spring 263, a first cam 630, a spacing member 640, a second cam 650, a yoke plug 660, and an elastic member 670.

The yoke plug 660 has a shape equal to a shape of a conventional yoke plug and is made from material equal to the conventional yoke plug. Meanwhile, the support yoke 610 yoke plug 660 has a fixing hole 615, with which the spacing member 640 is assembled.

The yoke spring 263 is inserted into a rear surface opposite to a surface making contact with the rack bar 140, the first cam 630 is assembled, and then the spacing member 640 is assembled with the fixing hole 615 through the first cam 630.

At this time, the spacing member 640 is assembled so as to allow a gap to be formed between the first cam 630 and the support yoke 610, similarly to the case where a gap of a predetermined interval is formed between a yoke plug and a support in a conventional manner.

The first cam 630 has, a cap-shape having a perforating hole formed at a center thereof, and has a first slanting surface 635 formed at a rear surface opposite to a surface facing the support yoke 610 in a circumferential direction of the support yoke 610.

The second cam 650 has a second slating surface 655 corresponding to the first slanting surface 635 of the first cam 630 so as to allow the first slanting surface 635 and the second slating surface 655 to make contact with each other so that when the second cam 650 rotates, the second cam 650 allows the first cam 630 and the second cam 650 to perform relative movement in right and left directions. The second cam 650 has a first groove 657 formed at a central part of the rear surface of the second cam 650.

The second groove 665 is formed at a central part of a front surface of the yoke plug 660. Therefore, when an apparatus for automatically adjusting clearance of a support yoke according to a second embodiment of the present invention is completely assembled, an elastic member 670 is disposed at a space formed by the first groove 657 and the second groove 665.

The elastic member 670 is a torsion spring, and has both ends assembled with the second cam 650 and the yoke plug 660, respectively. Therefore, when clearance is generated due to abrasion of the support yoke 610, etc., the elastic member 670 is released so as to rotate the second cam 650.

While the second cam 650 rotates, the first cam 630, the spacing member 640, the yoke spring 263, and the support yoke 610 move in a direction of a rack bar 140 due to relative movement between the second slating surface 655 and the first slanting surface 635, thereby automatically compensating clearance.

According to the present invention, an apparatus for automatically adjusting the clearance of a support yoke includes: a support yoke, which includes at least one first guide part formed along a circumference thereof while extending from a first large width part to a first small width part and at least one first fixing groove formed by recessing the first large width part; a cam, which includes at least one second guide part formed along a circumference of the cam while extending from a second large width part to a second small width part and at least one second fixing groove formed by recessing the second large width part; at least one spacing member, which is disposed along the second guide part and has a portion protruding from the second guide part; and at least one elastic member disposed between the first fixing groove and the second fixing groove, so that in a case where the support yoke is worn away due to friction, etc. against a rack bar, when the cam performs relative rotation movement respective to the support yoke by means of an elastic force of the elastic member disposed between the first fixing groove of the support yoke and the second fixing groove of the cam, the spacing member pushes the support yoke in a direction of the rack bar while moving along the first guide part of the support yoke so as to maintain a predetermined interval between the spacing member and the support yoke, thereby maintaining clearance of the support yoke at a predetermined degree.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, an exemplary embodiment of the present invention has not been described for limiting purposes so that the scope and spirit of the invention may not limited by the exemplary embodiment thereof. Accordingly, the scope of the invention is not to be limited by the above embodiments but by the claims and the equivalents thereof.

What is claimed is:

1. An apparatus for automatically adjusting clearance of a support yoke of a rack and pinion type steering apparatus, the apparatus comprising:
   a support yoke making contact with one side of a rack bar so as to support the rack bar;
   at least one cam assembled with one side of the support yoke so as to support the support yoke;
   a yoke plug which is positioned at one side of the at least one cam so as to support the at least one cam and is assembled with a rack housing; and
   a yoke spring included at one side of the support yoke so as to apply elastic force to the support yoke in a direction of the rack bar;
   wherein at least one axis parallel to at least one working surface of the at least one cam, and
   wherein the at least one elastic member is included in the at least one cam.

2. The apparatus as claimed in claim 1, wherein at least one spacing member is included in a portion where the support yoke and the at least one cam make contact with each other.

3. The apparatus as claimed in claim 1, wherein the support yoke includes at least one first guide part, which is formed along a circumference of the support yoke while extending from a first large width part to a first small width part, and at least one first fixing groove formed at the first large width part.

4. The apparatus as claimed in claim 3, wherein the at least one cam includes at least one second guide part, which is formed along a circumference of the at least one cam while extending from a second large width part to a second small width part, and at least one second fixing groove formed at the second large width part, and the at least one elastic member is included between the at least one second fixing groove and the at least one first fixing groove.

5. The apparatus as claimed in claim 4, wherein the at least one cam is disposed along the at least one second guide part, and at least one spacing member is inserted into at least one inserting groove formed at the at least one second guide part and has a portion protruding upward from the at least one second guide part.

6. The apparatus as claimed in claim 1, wherein the at least one cam is arranged and configured to rotate with respect to the support yoke.

* * * * *